(12) United States Patent
Imabayashi et al.

(10) Patent No.: US 6,709,168 B2
(45) Date of Patent: Mar. 23, 2004

(54) OPTICAL UNIT WITH INCREASED RELIABILITY

(75) Inventors: Hirofumi Imabayashi, Kawasaki (JP); Kenji Joko, Kawasaki (JP); Tsutomu Takahashi, Kawasaki (JP); Katsuya Fujii, Kawasaki (JP); Kazunori Omori, Fukuoka (JP); Yasunori Murata, Fukuoka (JP); Hideki Zenitani, Yokohama (JP); Koichi Namimatsu, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 151 days.

(21) Appl. No.: 10/100,970

(22) Filed: Mar. 19, 2002

(65) Prior Publication Data

US 2003/0048999 A1 Mar. 13, 2003

(30) Foreign Application Priority Data

Sep. 7, 2001 (JP) ........................ 2001-272600

(51) Int. Cl.[7] ............................. G02B 6/36; G02B 6/42; G02B 6/00
(52) U.S. Cl. ........................ 385/88; 385/134; 385/135
(58) Field of Search ...................... 385/88–90, 134–137

(56) References Cited

U.S. PATENT DOCUMENTS 5,956,449 A * 9/1999 Otani et al. ................ 385/134

* cited by examiner

Primary Examiner—Hemang Sanghavi
Assistant Examiner—Omar Rojas
(74) Attorney, Agent, or Firm—Katten Muchin Zavis Rosenman

(57) ABSTRACT

An optical unit includes photoelectric conversion modules, a plurality of adapter support members whose upper parts are rotatably supported, and a plurality of optical connector adapters attached to lower ends of the adapter support members so as to be arranged next to each other, the optical connector adapters being contained in the optical unit. The adapter support members are rotated separately so that the optical connector adapters are extracted outside from the optical unit with a space formed between each adjacent two of said optical connector adapters. Each of the optical connector adapters has insertion holes to which optical connectors of optical fibers extending from the photoelectric conversion modules and optical connectors of external optical fibers are connected.

13 Claims, 17 Drawing Sheets

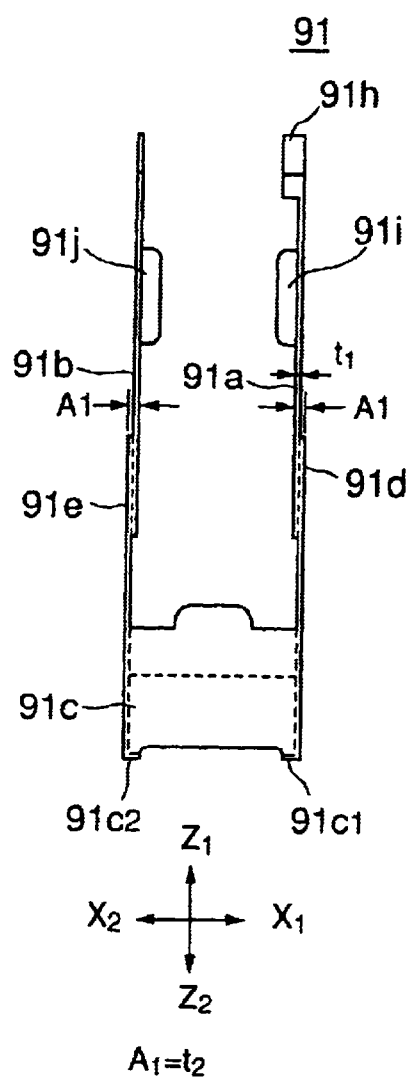
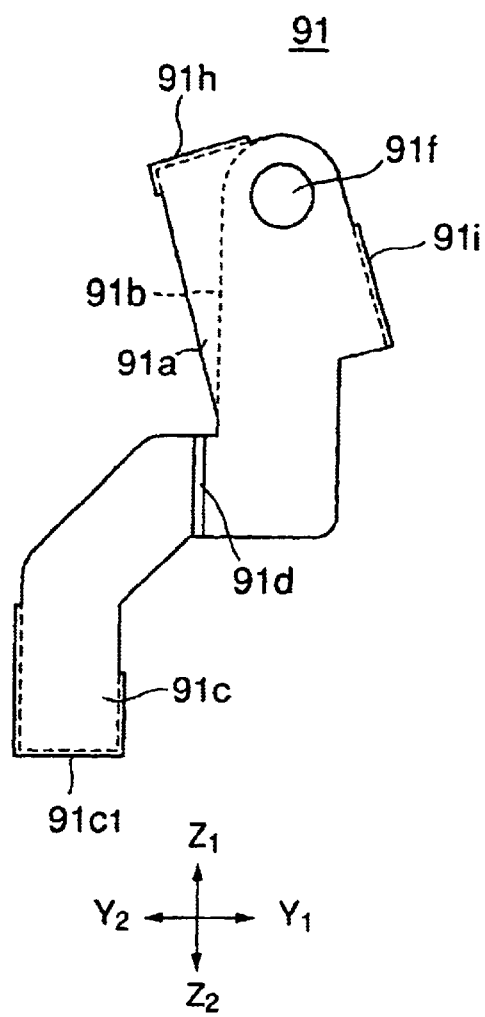

FIG.10A
FIG.10B
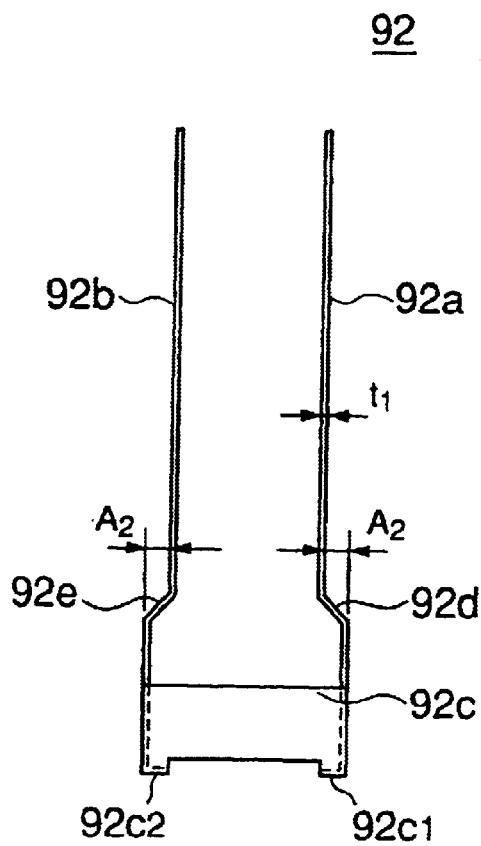
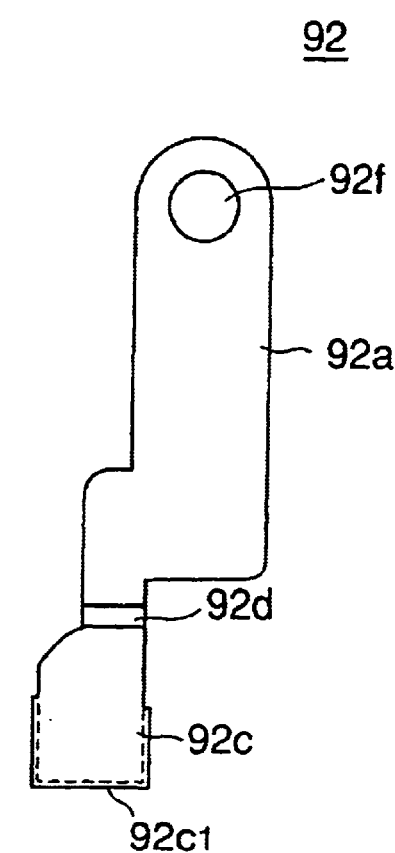
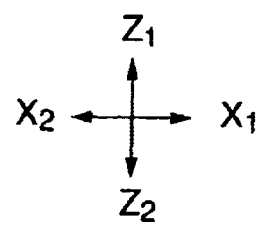
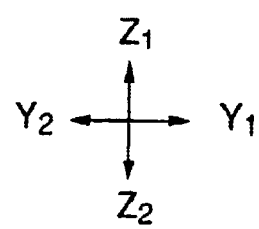
$A_2 = A_1 + t_1$ $A_3 = A_2 + t_1$ $A_4 = A_3 + t_1$

FIG.14A
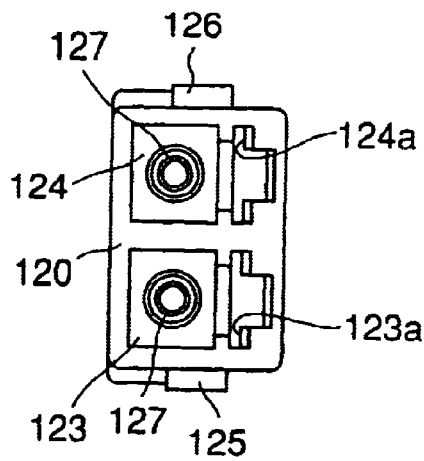
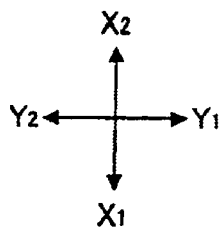
FIG.14B
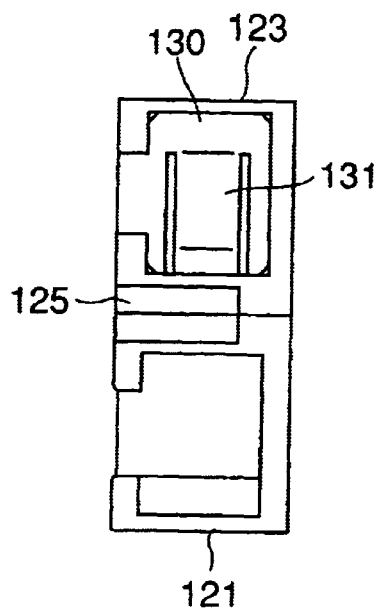
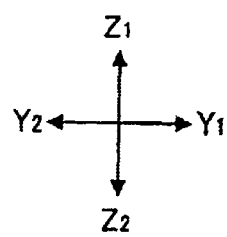
FIG.14C
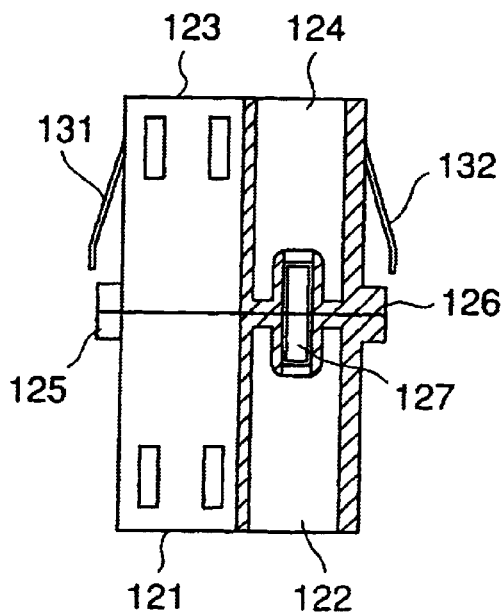
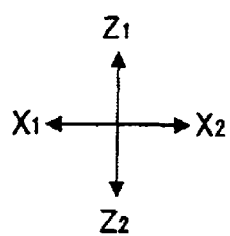

OPTICAL UNIT WITH INCREASED RELIABILITY

BACKGROUND OF THE INVENTION

1. Field of the Invention

The present invention generally relates to optical units, and more particularly to an optical unit including photoelectric conversion modules and adapters for optical connectors.

An optical unit, after being inserted into and mounted in a shelf, is used with its optical connector adapters being connected with optical connectors provided to the ends of optical fiber cables that are external lines.

With an improvement in the performance of a semiconductor device included in the optical unit, an information processing rate per one optical unit has become higher and higher. For instance, the conventional rate of 1.2 Gbps is now doubled to 2.4 Gbps.

As the information processing rate of the optical unit increases, the number of channels that a single optical unit can handle also increases. Accordingly, the optical unit is allowed to increase the number of optical connectors connected to its optical connector adapters by increasing the number thereof.

2. Description of the Related Art

FIGS. 1A and 1B are diagrams showing a conventional optical unit 10. The optical unit 10 is of a single channel. The optical unit 10 includes optical connector adapters 11 and 12 on the front side ($Y_2$ side in FIGS. 1A and 1B), photoelectric modules 13 and 14, a semiconductor device 15 for signal processing, and optical fibers 16 and 17 in the middle, and connectors 18 on the rear side ($Y_1$ side in FIGS. 1A and 1B). The optical fibers 16 and 17 each have one end fixed to the photoelectric modules 13 and 14, respectively, with the middle parts being engaged with a reel. Optical connectors 20 and 21 provided to the other ends of the optical fibers 16 and 17 are inserted into the upper connection holes of the optical connector adapters 11 and 12, respectively, so as to be connected to the optical connector adapters 11 and 12.

The optical unit 10 is inserted and plugged into a shelf 30 with the connectors 18 being connected with connectors 32 provided on a back wiring board 31.

Optical connectors 42 and 43 provided to ends of optical fiber cables 40 and 41 that are external lines are inserted into the lower connection holes of the optical connector adapters 11 and 12, respectively, so as to be connected with optical connector adapters 11 and 12. Thereby, the optical fibers 16 and 17 are connected with the optical fiber cables 40 and 41, respectively.

The optical connector adapters 11 and 12 are attached to a lower part of an arm-like adapter attachment member 51 whose upper part is supported by a shaft 50.

Normally, the adapter attachment member 51 is at a vertical position as shown in FIG. 1A with the optical connector adapters 11 and 12 and the adapter attachment member 51 being accommodated in a narrow space 53 formed in the optical unit 10 on its front side.

When the optical connectors 42 and 43 provided to the ends of the optical fiber cables 40 and 41 are connected with or pulled out from the optical connector adapters 11 and 12, first, as shown in FIG. 1B, an operator pulls and turns the adapter attachment member 51 toward herself/himself (in the $Y_2$ direction) with her/his fingers, and pulls the optical connector adapters 11 and 12 out of the space 53. Then, with the adapter attachment member 51 in this state, the operator performs connection or extraction of the optical fiber cables 40 and 41.

Since the two adapters 11 and 12 are pulled out together from the optical unit 10, a clearance a between the adapters 11 and 12 remains narrow outside the optical unit 10.

Therefore, even if levers for locking the optical connectors 42 and 43 to the adapters 11 and 12 were provided, it would be difficult to operate the levers. Accordingly, the optical connectors 42 and 43 are inserted into the adapters 11 and 12 so tight as to maintain connection by frictional force. Hence, if a strong pulling force is applied to the optical connectors 42 and 43, the optical connectors 42 and 43 may be pulled out from the adapters 11 and 12, thus questioning the reliability of the connection of the optical connectors 42 and 43 with the adapters 11 and 12.

In order to provide a lock mechanism, the clearance a between the adapters 11 and 12 is required to increase so that a finger of the operator may be allowed therein. This requires the space 53 to be considerably widened along the $Y_1$–$Y_2$ axis, thus causing the problem of increasing the optical unit 10 in size along the $Y_1$–$Y_2$ axis instead of downsizing the optical unit 10.

This problem is highlighted when the number of optical connector adapters is increased. Therefore, practically, it is not feasible to widen a clearance between adjacent optical connector adapters when the number of channels handled by a single optical unit is increased due to improvement in the information processing rate of a semiconductor device.

SUMMARY OF THE INVENTION

Accordingly, it is a general object of the present invention to provide an optical unit in which the above-described disadvantages are eliminated.

A more specific object of the present invention is to provide an optical unit whose reliability is increased without an increase in size.

The above objects of the present invention are achieved by an optical unit including photoelectric conversion modules, a plurality of adapter support members whose upper parts are rotatably supported, and a plurality of optical connector adapters attached to lower ends of the adapter support members so as to be arranged next to each other, the optical connector adapters being contained in the optical unit, wherein the adapter support members are rotated separately so that the optical connector adapters are extracted outside from the optical unit with a space formed between each adjacent two of the optical connector adapters, each of the optical connector adapters has insertion holes formed on each of first and second opposing sides thereof, optical connectors provided to ends of optical fibers extending from the photoelectric conversion modules are connected to the insertion holes formed on the first sides of the optical connector adapters, and optical connectors provided to ends of external optical fibers are connected to the insertion holes formed on the second sides of the optical connector adapters.

According to the above-described optical unit, the adapter support members are rotated independently so that the space, into which a finger is inserted for performing a connection operation, is formed between each adjacent two of the optical connector adapters. Accordingly, the optical unit permits usage of an optical connector with a lock lever, thus increasing the reliability of optical connector connections.

BRIEF DESCRIPTION OF THE DRAWINGS

Other objects, features and advantages of the present invention will become more apparent from the following detailed description when read in conjunction with the accompanying drawings, in which:

FIGS. 9A and 9B are a front view and a side view, respectively, of a first adapter support member of the optical connector adapter assembly according to the present invention;

FIGS. 10A and 10B are a front view and a side view, respectively, of a second adapter support member of the optical connector adapter assembly according to the present invention;

FIGS. 14A through 14C are a top view, a side view, and a rear view, respectively, of the optical connector adapter of FIG. 13;

DETAILED DESCRIPTION OF THE PREFERRED EMBODIMENTS

A description will now be given, with reference to the accompanying drawings, of an embodiment of the present invention.

In the following drawings, the $Y_1$–$Y_2$ axis represents a rear-front dimension.

Figure 1A:
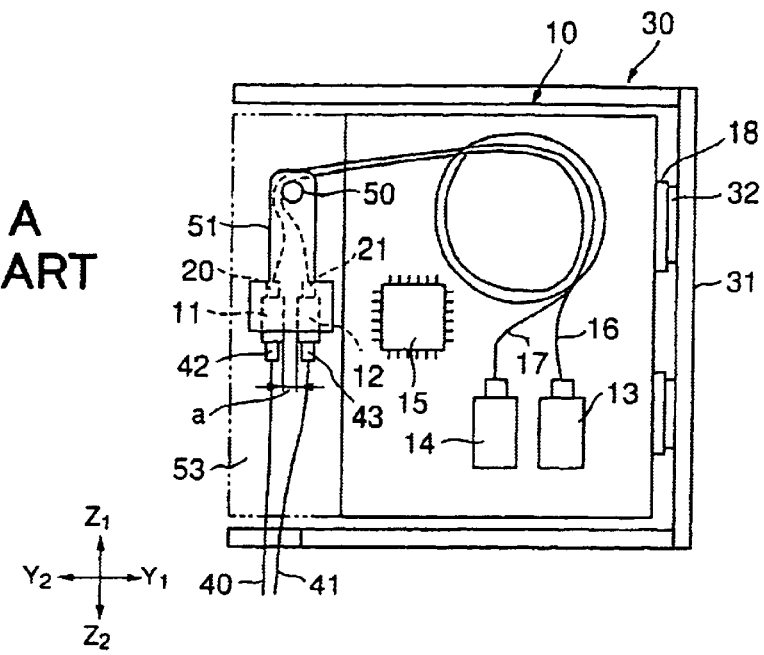
FIGS. 1A and 1B are diagrams showing a conventional optical unit.
Figure 1B:
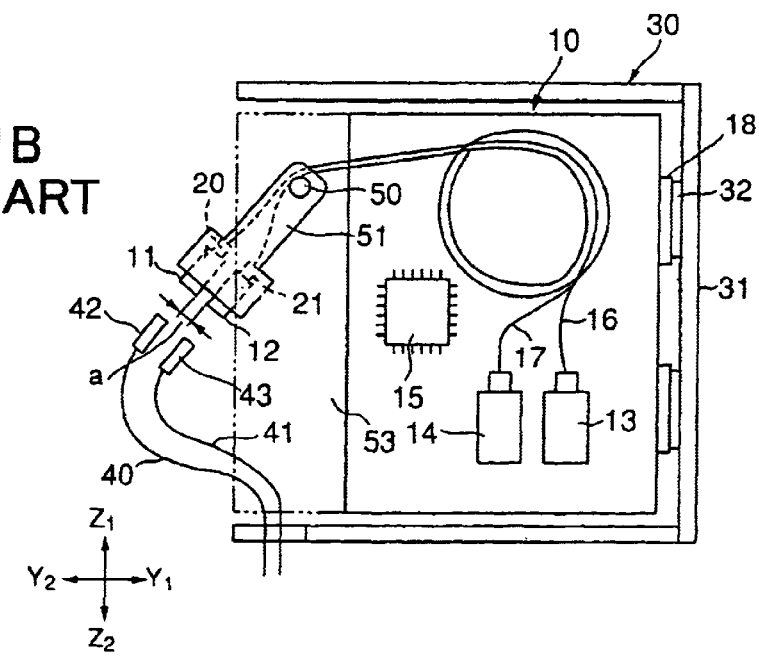
Figure 2:
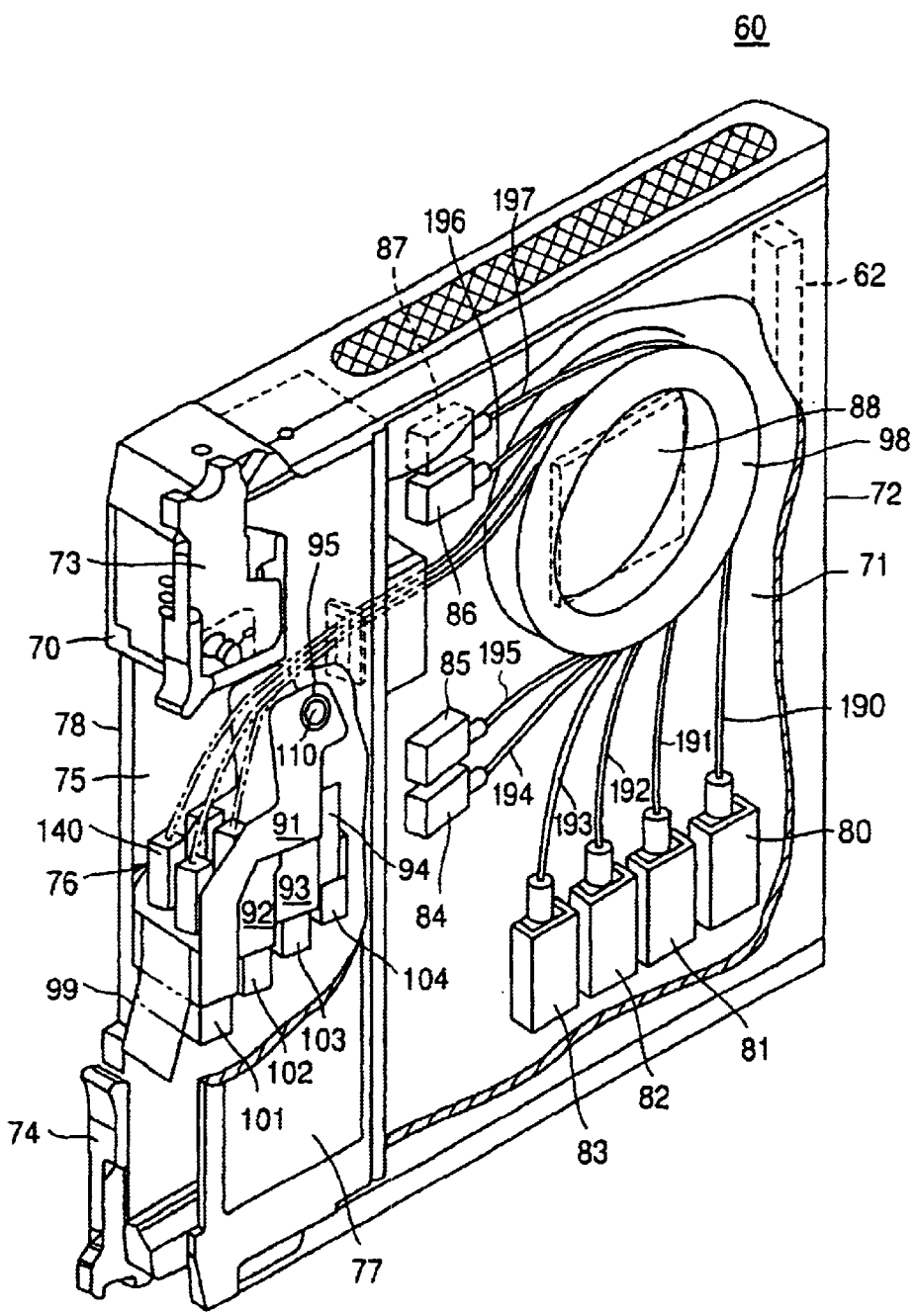
FIG. 2 is a perspective view of an optical unit according to an embodiment of the present invention.
Figure 3:
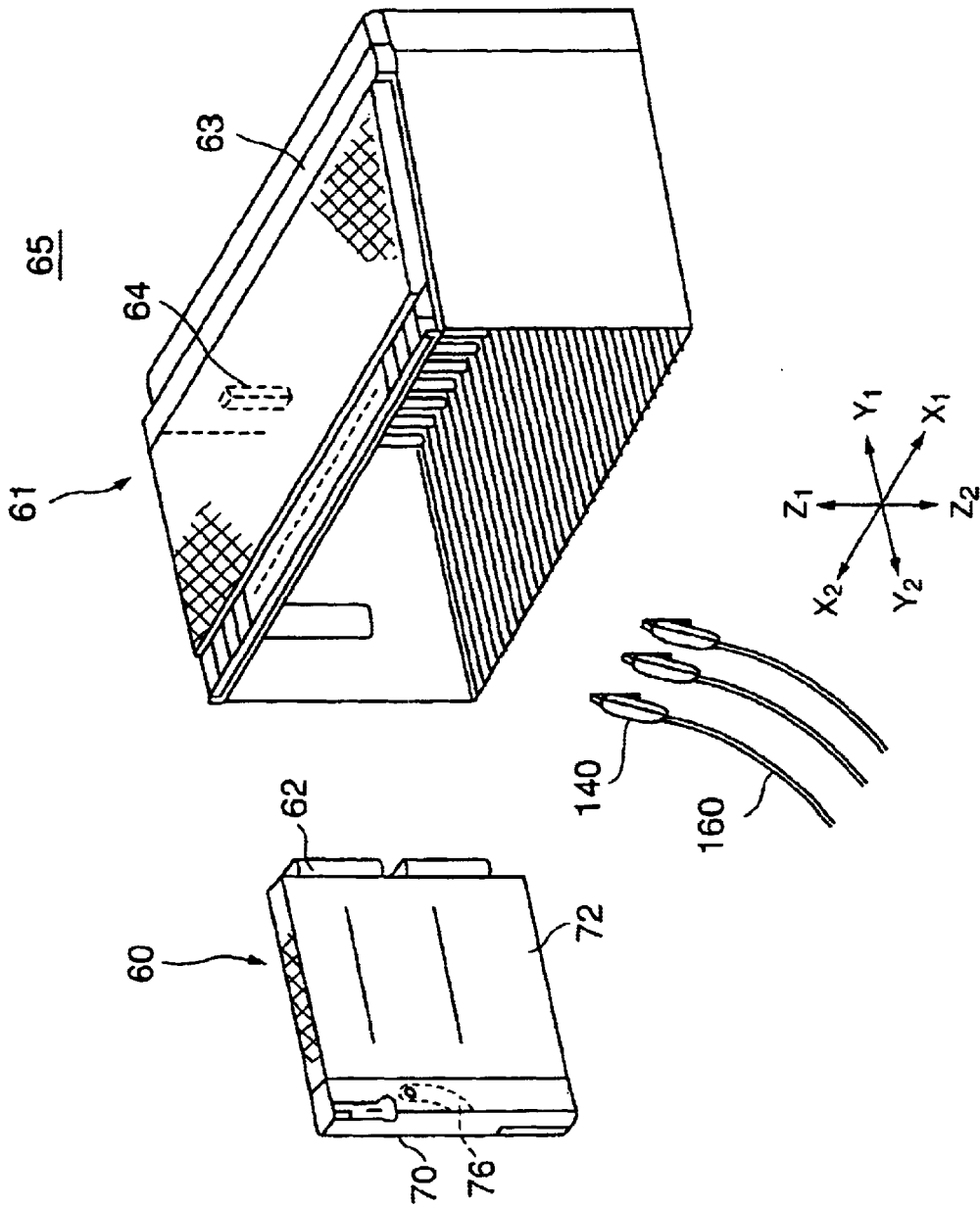
FIG. 3 is an exploded perspective view of an communication apparatus formed by the optical unit of FIG. 2.
Figure 4:
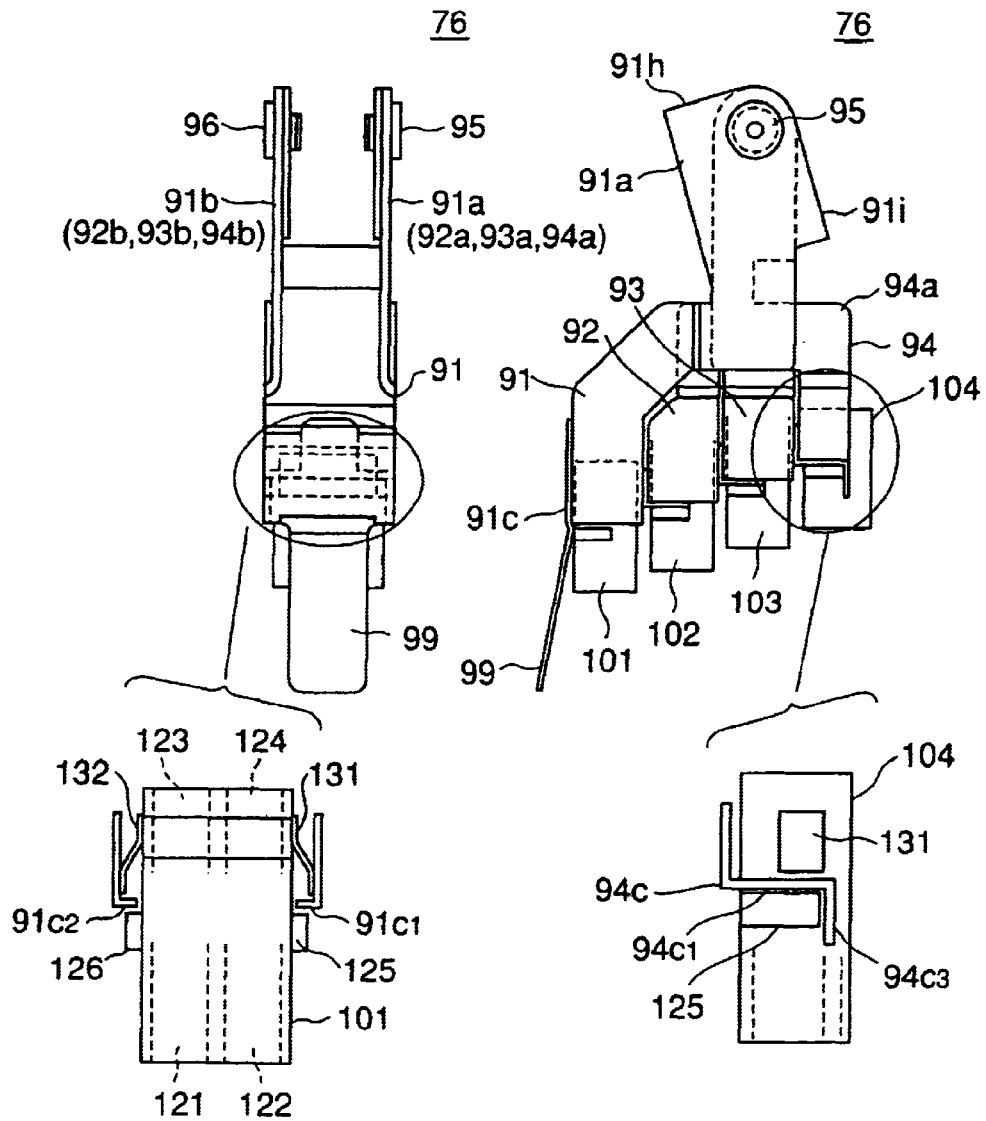
FIGS. 4A and 4B are diagrams showing an optical connector adapter assembly of the optical unit of FIG. 2.

FIG. 2 is a diagram showing an optical unit 60 according to the embodiment of the present invention. The optical unit 60 is inserted upright into a shelf 61 as shown in FIG. 3 and plugged thereinto with connectors 62 being connected with connectors 64 provided to a back wiring board 63, thereby forming a communication apparatus 65.

The optical unit 60 is of a four-channel type and includes a front member 70, a printed board 71 whose $Y_2$ side is fixed to the front member 70, and a case 72 surrounding the printed board 71.

Card levers 73 and 74 are attached to the front member 70. The front member 70 is substantially shaped like a box with a space 75 having an opening on the $Y_2$ side being formed between $X_1$-side and $X_2$-side walls 77 and 78. An optical connector adapter assembly 76 that forms the essential part of the present invention is provided in the space 75.

Photoelectric conversion modules 80 and 81 for the first channel, photoelectric conversion modules 82 and 83 for the second channel, photoelectric conversion modules 84 and 85 for the third channel, photoelectric conversion modules 86 and 87 for the fourth channel, and a semiconductor device 88 are mounted on the printed board 71.

Optical fibers 190 through 197 extending from the photoelectric conversion modules 80 through 87, respectively, are properly engaged with a reel 98, and extend therefrom into the space 75 of the front member 70 to be connected with the adapter assembly 76.

Next, a description will be given of the optical connector adapter assembly 76.

As shown in FIGS. 4A through 7, the adapter assembly 76 includes first through fourth adapter support members 91 through 94 that are combined so that the second through fourth adapter support members 92 through 94 are positioned inside the first through third adapter support members 91 through 93, respectively. The first through fourth adapter support members 91 through 94 are joined by flanged shaft members 95 and 96 and E washers 97 and 98. Optical connector adapters 101 through 104 are attached to the adapter support members 91 through 94, respectively. The adapter assembly 76 is attached to the front member 70 with bolt members 110 and 111 being fitted to the flanged shaft members 95 and 96, respectively. Each of the adapter support members 91 through 94 is a sheet metal member formed by bending and properly spot-welding sheet metal members of a thickness t1 (shown in FIG. 9A) stamped out by a press to have given shapes.

Figure 6:
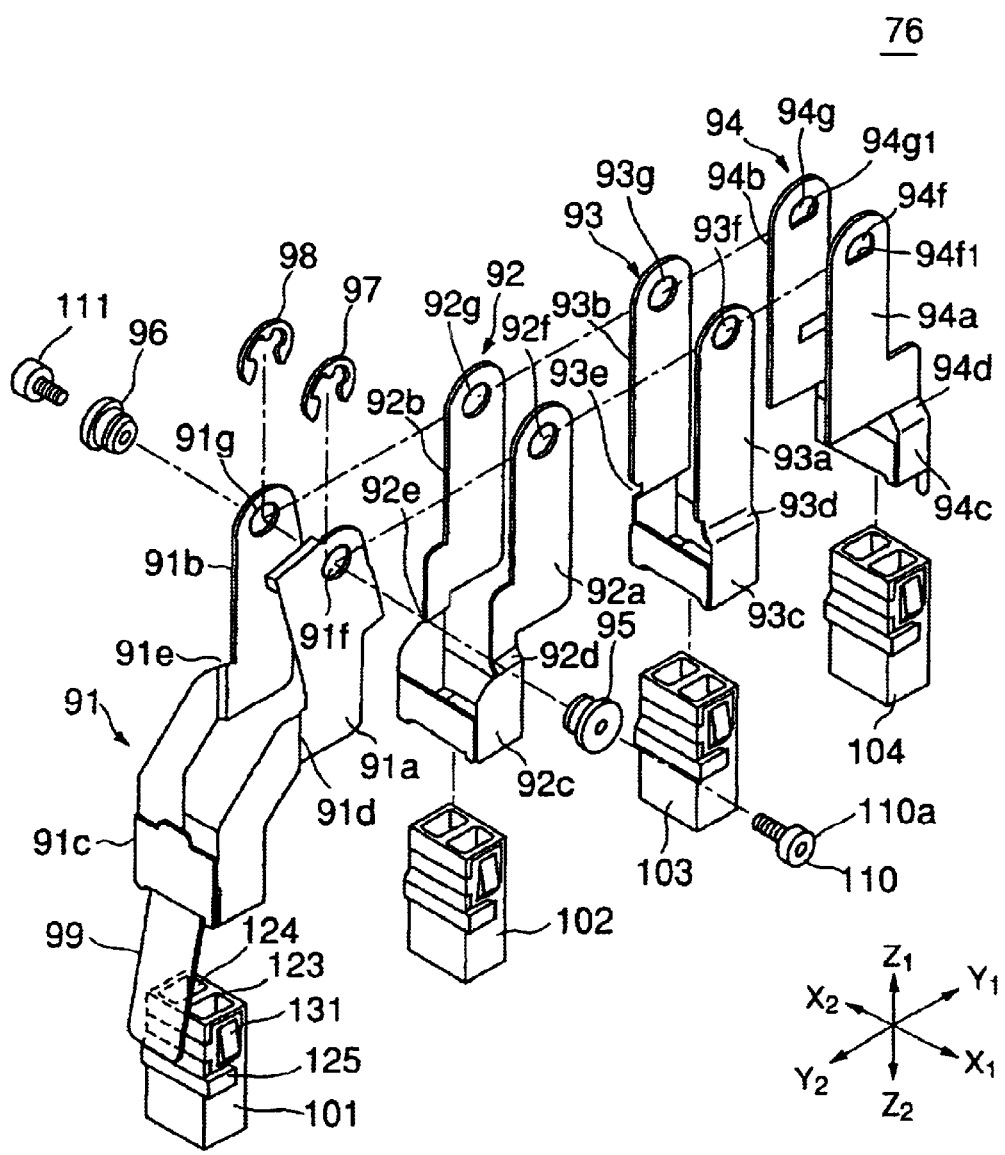
FIG. 6 is an exploded perspective view of the optical connector adapter assembly according to the present invention.

As shown in FIGS. 6, 9A, and 9B, the first adapter support member 91 includes two opposing arm parts 91a and 91b cranked (formed) in the $Y_2$ direction and an adapter attachment part 91c of a square-frame shape formed on the lower ends of the arm parts 91a and 91b.

As shown in FIGS. 6, 10A, and 10B, the second adapter support member 92 includes two opposing arm parts 92a and 92b cranked in the $Y_2$ direction and an adapter attachment part 92c of a square-frame shape formed on the lower ends of the arm parts 92a and 92b.

Figure 11A:
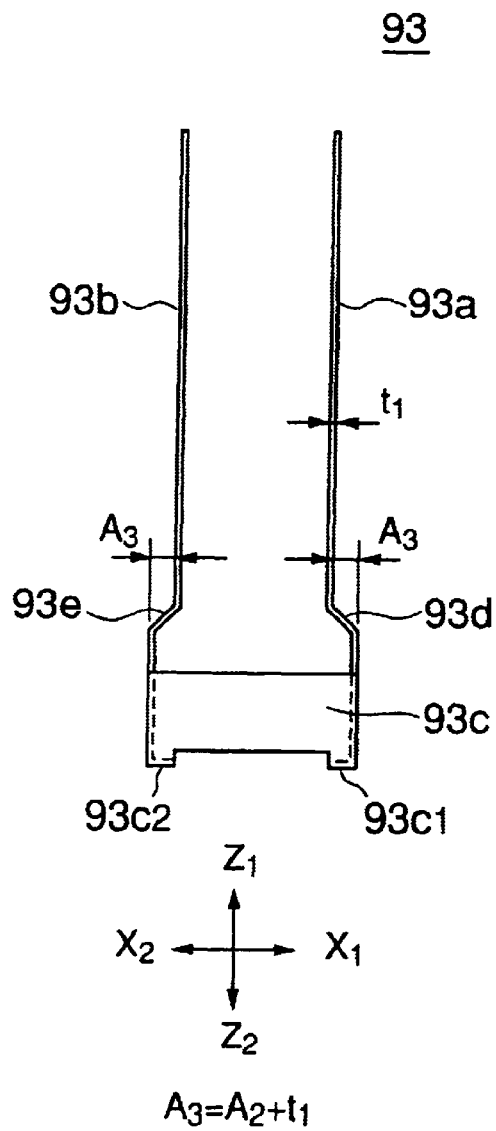
FIGS. 11A and 11B are a front view and a side view, respectively, of a third adapter support member of the optical connector adapter assembly according to the present invention.
Figure 11B:
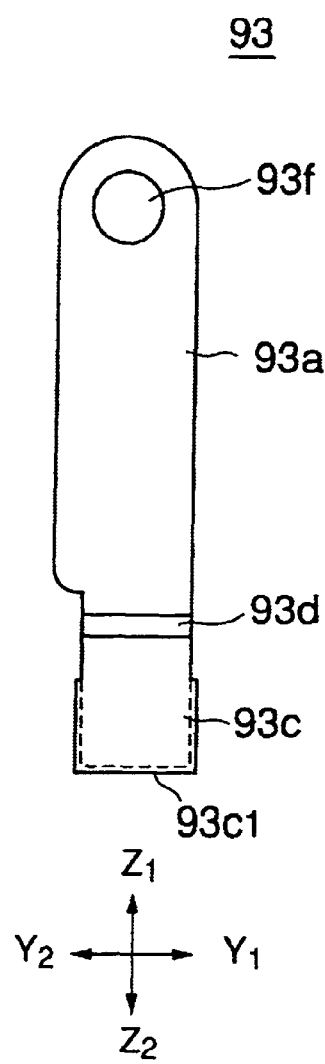

As shown in FIGS. 6, 11A, and 11B, the third adapter support member 93 includes two opposing linear arm parts 93a and 93b and an adapter attachment part 93c of a square-frame shape formed on the lower ends of the arm parts 93a and 93b.

Figure 12A:
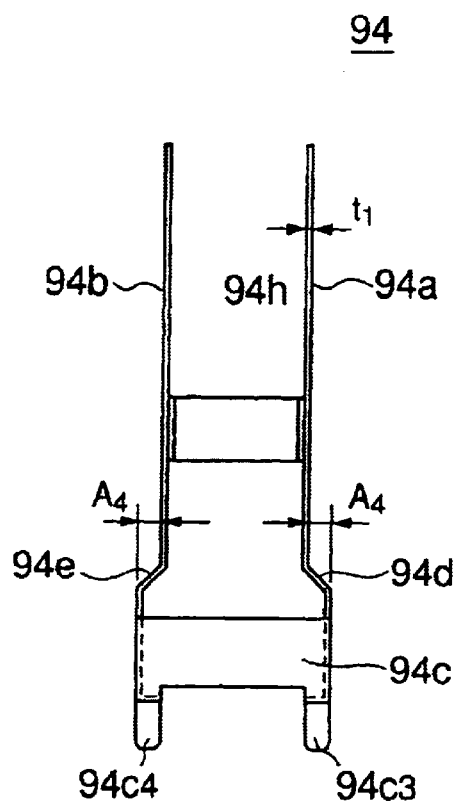
FIGS. 12A and 12B are a front view and a side view, respectively, of a fourth adapter support member of the optical connector adapter assembly according to the present invention.
Figure 12B:
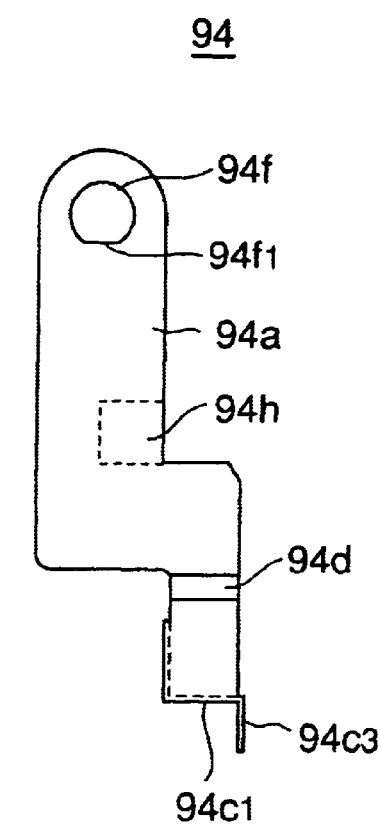

As shown in FIGS. 6, 12A, and 12B, the fourth adapter support member 94 includes two opposing arm parts 94a and 94b cranked in the $Y_1$ direction and an adapter attachment part 94c formed on the lower ends of the arm parts 94a and 94b. The adapter attachment part 94c has a shape obtained by cutting a square frame in halves.

The arm parts 91a through 94a and 91b through 94b of the adapter support members 91 through 94 include step parts 91d through 94d and 91e through 94e, respectively. The step parts 91d through 94d and the step parts 91e through 94e are provided in symmetry along the $X_1$–$X_2$ axis, or in the $X_1$–$X_2$ directions. The step parts 91d through 94d have respective step sizes A1 through A4 determined to satisfy A1<A2<A3<A4 with a difference of the thickness t1 of each of the arm parts 91d through 94d being provided between A1 and A2, A2 and A3, and A3 and A4. The step parts 91e through 94e also have the same step sizes A1 through A4, respectively. Thereby, the arm parts 92a and 92b are positioned inside the arm parts 91a and 91b, the arm parts 93a and 93b are positioned inside the arm parts 92a and 92b, and the arm parts 94a and 94b are positioned inside the arm parts 93a and 93b so that the arm parts 91a through 94a overlap one another and the arm parts 91b through 94b overlap one another. The step size A1 of the step part 91d is equal to a thickness t2 of a later-described flange part 95b.

Figure 7:
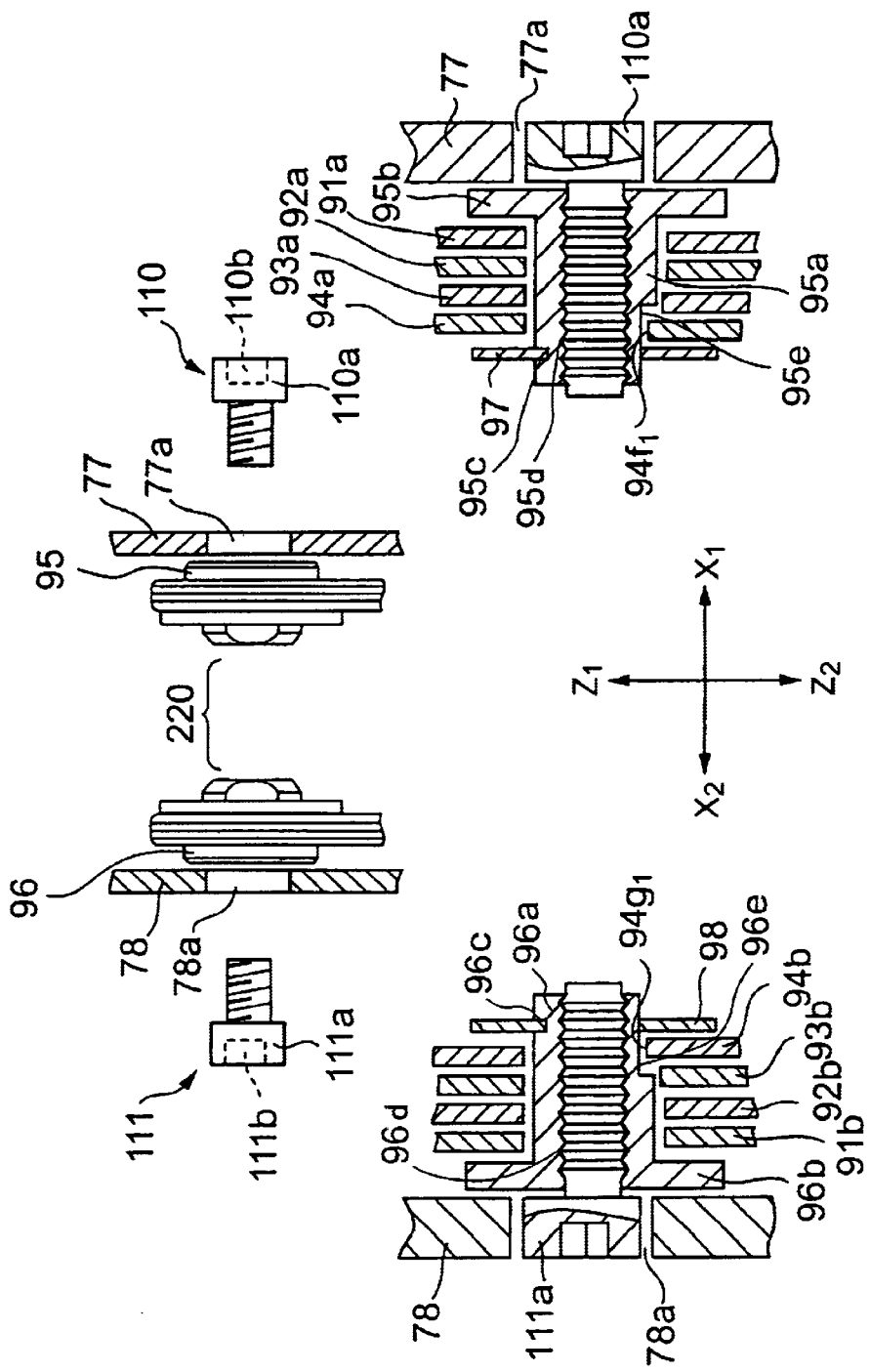
FIG. 7 is a diagram for illustrating a mechanism supporting the optical connector adapter assembly according to the present invention.
Figure 8:
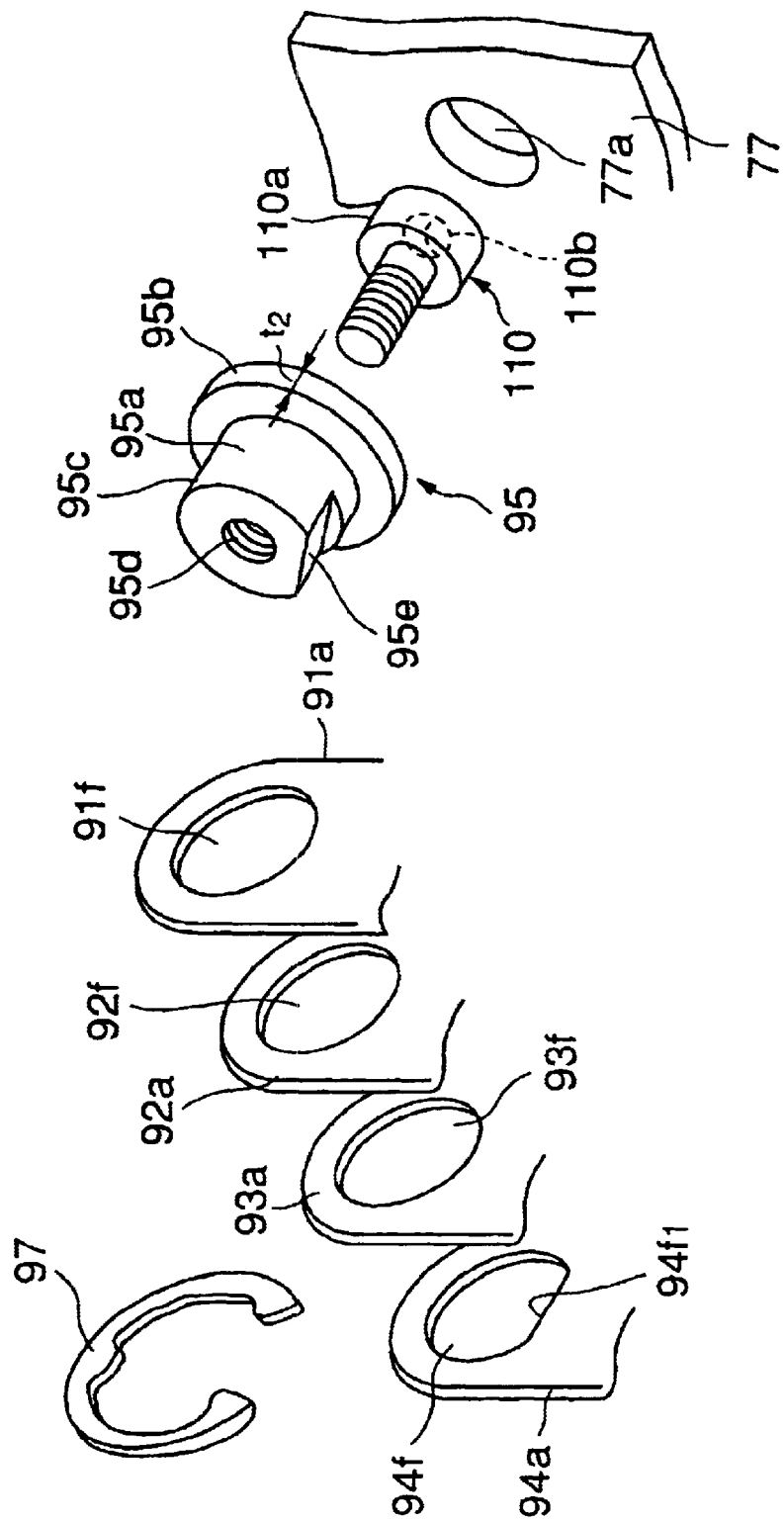
FIG. 8 is another diagram for illustrating the supporting mechanism of FIG. 7.

As shown in FIGS. 7 and 8, the arm parts 91a through 94a are supported by the flanged shaft member 95 and the E washer 97. As shown in FIG. 8, the flanged shaft member 95 includes a shaft part 95a, the flange part 95b formed on a longitudinal end (the $X_1$ end in FIG. 7) of the shaft part 95a, a groove 95c formed in a vertical end (the $Z_1$ end in FIG. 7) of the shaft part 95a, a female screw part 95d penetrating the shaft part 95a, and a plane part 95e formed by cutting off part of the other vertical end (the $Z_2$ end in FIG. 7) of the shaft part 95a. The shaft part 95a penetrates holes 91f through 94f with the E washer 97 being fitted and attached to the groove 95c. Accordingly, the arm parts 91a through 94a are supported by the shaft part 95a between the flange part 95b and the E washer 97.

Just as the arm parts 91a through 94a, the arm parts 91b through 94b have respective holes 91g through 94g supported by the flanged shaft member 96 and the E washer 98. The flanged shaft member 96 has the same shape as the flanged shaft member 95, and includes a shaft part 96a, a flange part 96b, a groove 96c, a female screw part 96d, and a plane part 96e.

The holes 91f through 93f and the holes 91g through 93g are circular so that each of the first through third adapter support members 91 through 93 is independently rotatable with respect to the flanged shaft members 95 and 96. On the other hand, the holes 94f and 94g of are shaped like a truncated circle, or a circle whose lower part is filled in as shown in FIGS. 8 and 12B. The holes 94f and 94g have respective chord parts $94f_1$ and $94g_1$. The chord parts $94f_1$ and $94g_1$ contact the plane parts 95e and 96e of the shaft parts 95a and 96a so that the fourth adapter support member 94 is restrained from rotating between the flanged shaft members 95 and 96.

A stopper 91h is formed on the upper end of the arm part 91a of the first adapter support member 91. Engaging strips 91i and 91j are formed by bending parts of the $Y_1$ ends of the arm parts 91a and 91b inwardly toward each other, that is, in the $X_2$ and $X_1$ directions, respectively. The arm parts 94a and 94b of the fourth adapter support member 94 are connected by a beam part 94h.

The adapter attachment parts 91c through 94c of the first through fourth adapter support members 91 through 94 have sizes so that the optical connector adapters 101 through 104 are fitted thereto, respectively, and are equal in $X_1$–$X_2$ dimensions. The adapter attachment parts 91c through 93c are also equal in $Y_1$–$Y_2$ dimensions. Since the arm parts 91a through 94a overlap one another and the arm parts 91b through 94b overlap one another, the adapter attachment parts 91c through 94c of the first through fourth adapter support members 91c through 94c are arranged closely along the $Y_1$–$Y_2$ axis or in the $Y_1$–$Y_2$ directions as shown in FIG. 4B.

The adapter attachment part 91c includes engaging strips $91c_1$ and $91c_2$ formed by bending the lower ends of the $X_1$ and $X_2$ sides of the adapter attachment part 91c in the $X_2$ and $X_1$ directions, respectively. The adapter attachment parts 92c and 93c have the same structure as the adapter attachment part 91c. That is, the adapter attachment part 92c includes engaging strips $92c_1$ and $92c_2$ and the adapter attachment part 93c includes engaging strips $93c_1$ and $93c_2$.

The $Y_1$-side adapter attachment part 94c includes engaging strips $94c_1$ and $94c_2$ formed by bending the lower ends of the $X_1$ and $X_2$ sides of the adapter attachment part 91c inwardly toward each other, that is, in the $X_2$ and $X_1$ directions, respectively. The adapter attachment part 94c further includes engaging strips $94c_3$ and $94c_4$ formed to extend in the $Z_2$ direction from the $X_1$ and $X_2$ ends of the lower end of the $Y_1$ side of the adapter attachment part 94c, respectively.

A tag 99 is attached to the $Y_2$-side adapter attachment part 91c for protecting the eyes of an operator from a laser beam.

Next, a description will be given, with reference to FIGS. 13 through 15B, of the optical connector adapter 101 and an optical connector 140.

The optical connector adapter 101 is an LC adapter and includes a housing 120 of a rectangular parallelepiped shape and a U-shaped leaf spring member 130 fitted to the outside of the housing 120.

The housing 120 has optical connector insertion holes 121 and 122 formed therein from the $Z_2$ side and optical connector insertion holes 123 and 124 formed therein from the $Z_1$ side. The optical connector insertion holes 121 and 122 are arranged side by side in the $X_1$–$X_2$ directions, and the optical connector insertion holes 123 and 124 are arranged side by side in the $X_1$–$X_2$ directions. Further, the optical connector insertion holes 121 and 123 are aligned along the $Z_1$–$Z_2$ axis or in the $Z_1$–$Z_2$ directions, and the optical connector insertion holes 122 and 124 are aligned in the $Z_1$–$Z_2$ directions. Split sleeves 127 are provided in the center part of the housing 120.

The optical connector insertion holes 121 through 124 have respective engaging parts 121a through 124a.

Ribs 125 and 126 are provided in the center parts of the $X_1$-side surface and the $X_2$-side surface of the housing 120, respectively.

The U-shaped leaf spring member 130 is provided above the ribs 125 and 126, that is, on the $Z_1$ side therefrom, on the housing 120. The U-shaped leaf spring member 130 includes plates 131 and 132 protruding obliquely from the $X_1$ and $X_2$ sides thereof, respectively.

The other optical connector adapters 102, 103, and 104 have the same configuration as the optical connector adapter 101.

As shown in FIG. 6, the optical connector adapter 101 is attached to the adapter attachment part 91c of the first adapter support member 91 by being inserted thereinto from the bottom, or the $Z_2$ side. The plates 131 and 132 are pressed flat in entering the adapter attachment part 91c and spread again inside the adapter attachment part 91c. As shown enlarged in FIG. 4A, the optical connector adapter 101 is attached to the adapter attachment part 91c with the engaging strips $91c_1$ and $91c_2$ being sandwiched between the plate 131 and the rib 125 and between the plate 132 and the rib 126, respectively.

The optical connector adapters 102 and 103 are attached to the adapter attachment parts 92c and 93c, respectively, in the same manner as the optical connector adapter 101 is attached to the adapter attachment parts 91c.

As shown enlarged in FIG. 4B, the optical connector adapter 104 is attached to the adapter attachment part 94c with the engaging strips $94c_1$ and $94c_2$ being sandwiched between the plate 131 and the rib 125 and between the plate 132 and the rib 126, respectively, and the $Y_1$ ends of the ribs 125 and 126 being engaged with and held by the engaging strips $94c_3$ and $94c_4$, respectively.

The optical connector adapter assembly 76 has the above-described configuration. Since the adapter support members 91 through 94 are attached to the front member 70 as a single unit of the optical connector adapter assembly 76, the optical unit 60 may be assembled more easily than an optical unit in which adapter support members are attached thereto one by one.

Figure 13:
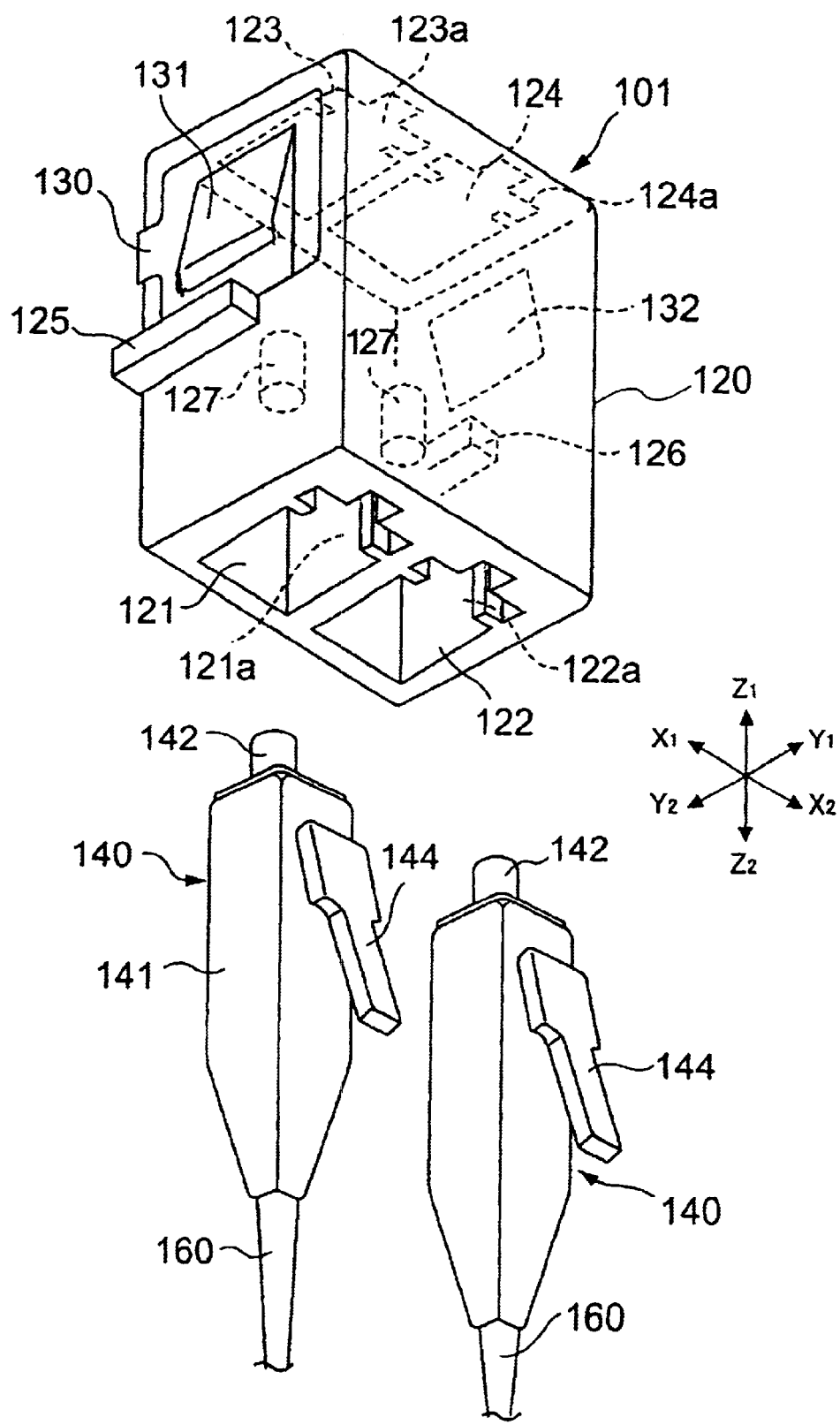
FIG. 13 is a diagram showing an optical connector adapter of the optical unit of FIG. 2 and corresponding optical connectors according to the present invention.
Figure 15A:
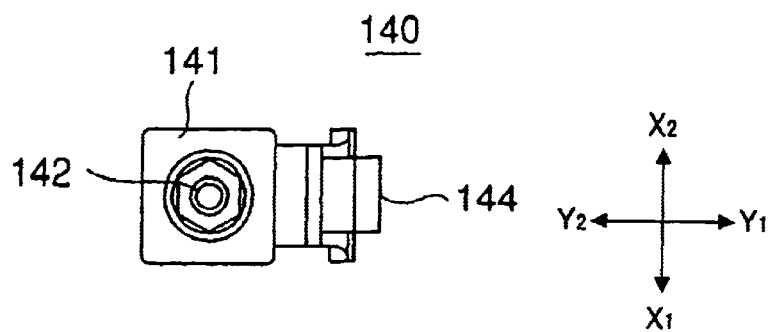
FIGS. 15A and 15B are a top view and a side view, respectively, of any of the optical connectors of FIG. 13.
Figure 15B:
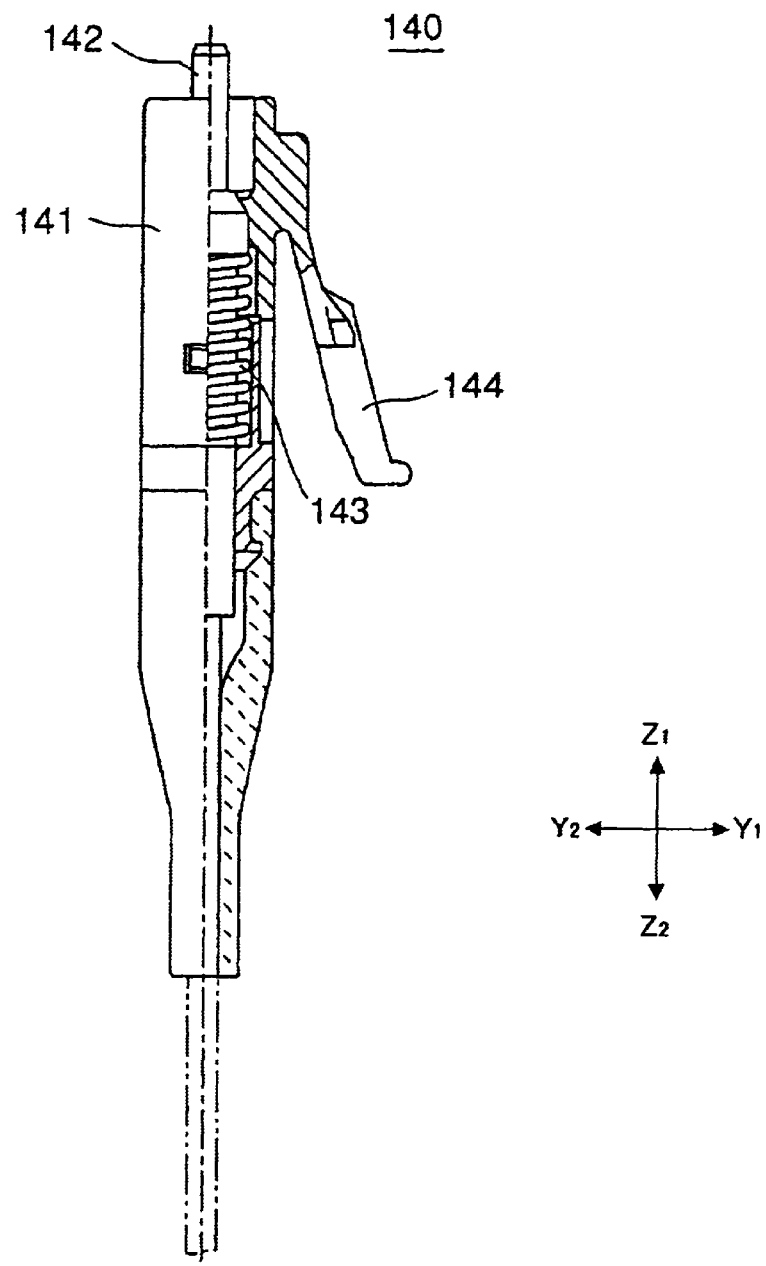

Each of the optical connectors 140, which is an LC connector as shown in FIGS. 13, 15A, and 15B, is connected to an end of an optical fiber cable 160 as shown in FIG. 3. Each optical connector 140 includes a main body 141 of a synthetic resin. A ferrule 142 is provided to the tip of the main body 141 so as to protrude therefrom. A coil spring 143 for pushing the ferrule 142 forward is incorporated in the main body 141. Each optical connector further includes a lock lever 144 formed integrally with the main body 141.

Figure 5:
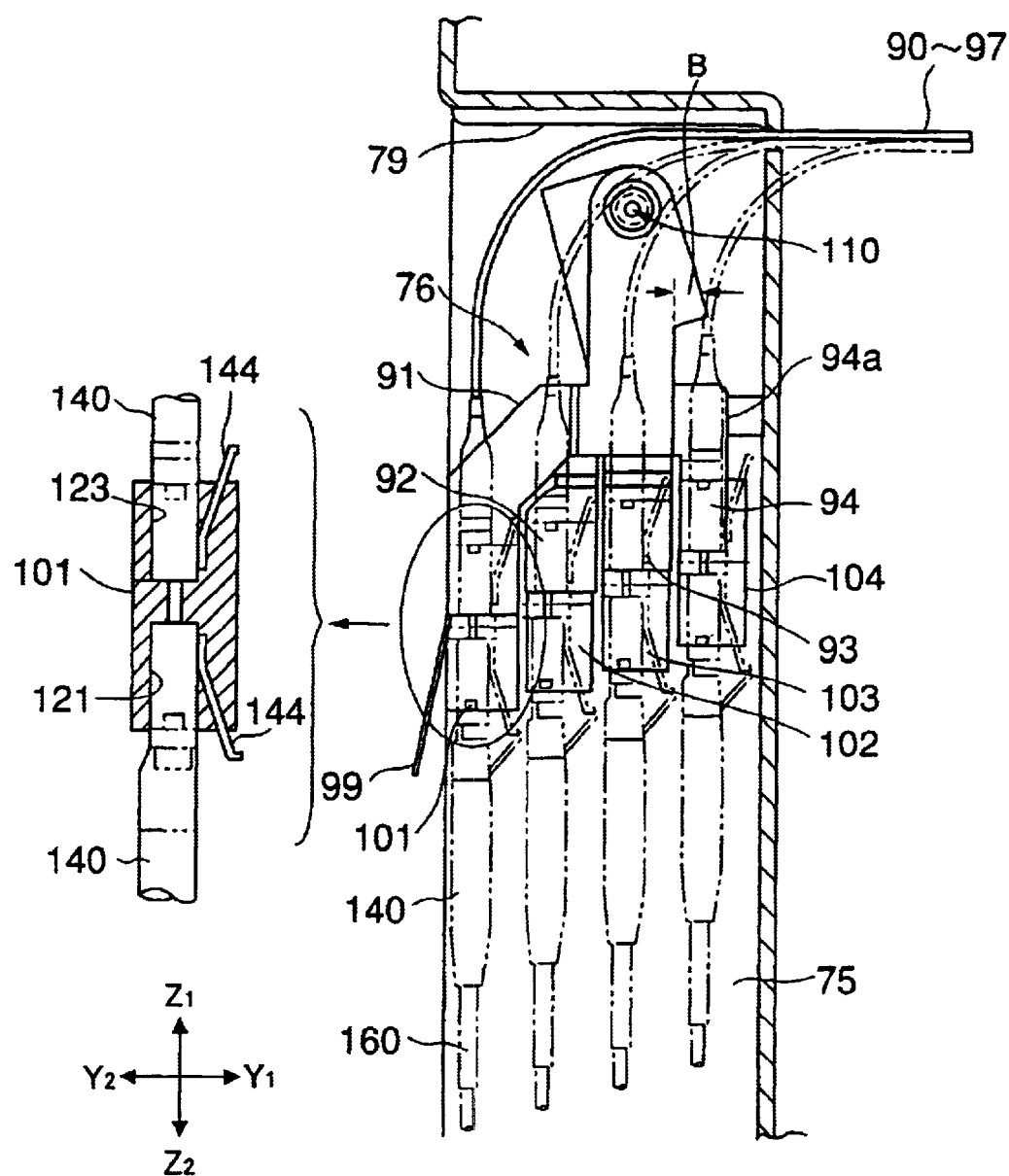
FIG. 5 is a diagram showing the optical connector adapter assembly of FIGS. 4A and 4B attached to the optical unit of FIG. 2.

As shown in FIGS. 2, 5, and 7, the optical connector adapter assembly 76 is attached to the front member 70 in the space 75 with the bolt member 110 being screwed into the female screw part 95d of the shaft member 95 through a circular hole 77a of the wall 77 from the $X_1$ side of the front member 70 and the bolt member 111 being screwed into the female screw part 96d of the shaft member 96 through a circular hole 78a of the wall 78 from the $X_2$ side of the front member 70.

When the operator screws the bolt member 110 and 111 into the female screw parts 95d and 96d, the shaft members 95 and 96 are prevented from rotating. Therefore, the operator is not required to hold the shaft members 95 and 96 by fingertips to prevent idle rotation of the shaft members 95 and 96. Accordingly, the bolt members 110 and 111 are tightened with ease.

The bolt members 110 and 111 include respective cylindrical head parts 110a and 111a. Hexagonal holes 110b and 111b for screwing are formed on end surfaces (that is, the $X_1$ and $X_2$ end surfaces in FIG. 7) of the head parts 110a and 111a, respectively. The head parts 110a and 111a are fitted rotatably into the circular holes 77a and 78a, respectively.

Next, a description will be given of how the optical connector adapter assembly 76 operates.

Before operation, the adapter assembly 76 is in a pendent state, being supported by the bolt members 110 and 111 in the circular holes 77a and 78a of the walls 77 and 78 as shown in FIGS. 2, 4A, 4B, and 5. In this state, the adapters 101 through 104 are housed in the space 75, being arranged closely side by side in the $Y_1$–$Y_2$ directions.

The $Y_1$ ends of the arm parts 92a through 94a of the adapter support members 92 through 94 are aligned and the $Y_1$ ends of the arm parts 92b through 94b of the adapter support members 92 through 94 are aligned. The engaging strips 91i and 91j are positioned away from the $Y_1$ ends of the arm parts 92a and 92b by a dimension (distance) B in the $Y_1$ direction.

When the operator catches the first adapter support member 91 in the initial position on her/his finger and pulls the first adapter support member 91 in the $Y_2$ direction, the first adapter support member 91 is rotated clockwise to be pulled out from the space 75 toward the $Y_2$ direction.

Figure 16A:
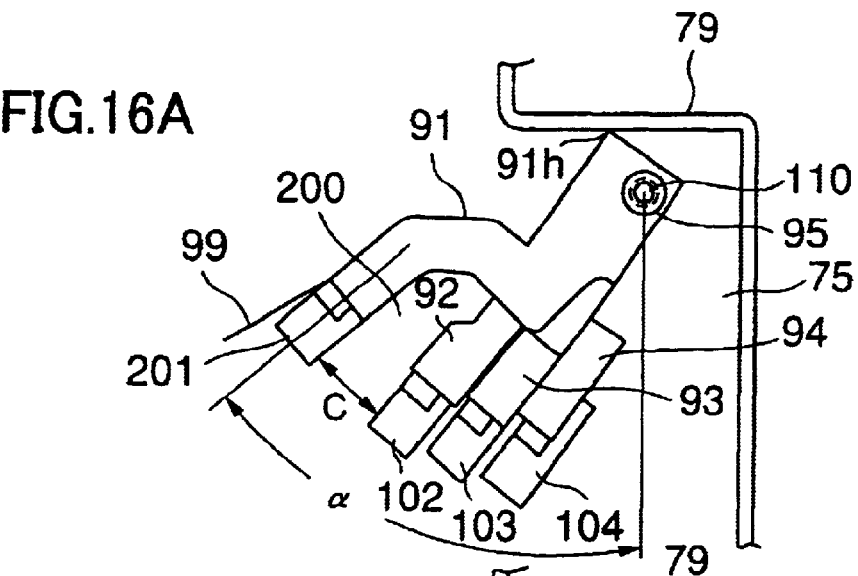
FIGS. 16A through 16C are diagrams showing states of operation of the optical connector adapter assembly according to the present invention.

As shown in FIG. 16A, the first adapter support member 91 is rotated up to a position where the stopper 91h contacts a top plate part 79 defining the upper limit of the space 75. An angle of rotation (a rotation angle) α formed by this rotation between the initial and rotated positions is a maximum pull-out angle, which is approximately 45°. The first adapter support member 91 is designed so as not to rotate by more than the rotation angle α in order that a laser beam may not hurt the eyes of the operator.

While the first adapter support member 91 is rotated clockwise, at some point, the engaging strips 91i and 91j engage and hold the arm parts 92a through 94a and 92b through 94b of the second through fourth adapter support members 92 through 94. Thereafter, following the first adapter support member 91, the second through fourth adapter support members 92 through 94 are rotated clockwise to be pulled out from the space 75 in the $Y_2$ direction.

At this point, a space 200 exists between the adapter 101 attached to the first adapter support member 91 and the adapter 102 attached to the second adapter support member 92. A dimension C of the space 200 is determined by the dimension B so as to allow a finger 210 therein.

Figure 16B:
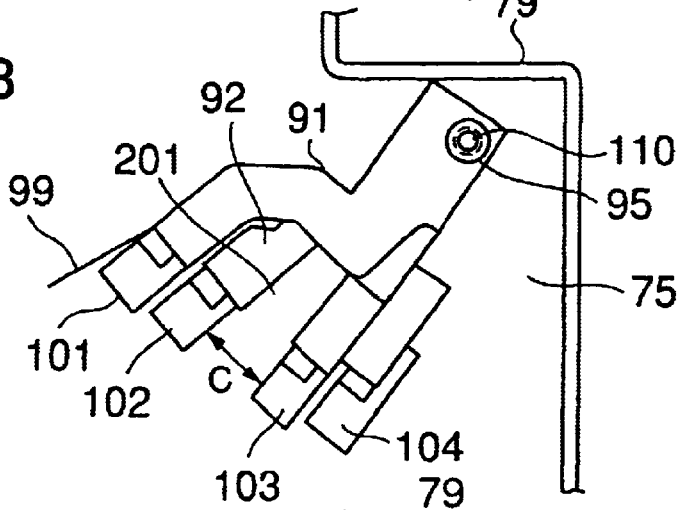

When the operator catches the second adapter support member 92 on her/his finger and pulls the second adapter support member 92 in the $Y_2$ direction in the state shown in FIG. 16A, the second adapter support member 92 is independently rotated in the $Y_2$ direction to enter a state shown in FIG. 16B, where a space 201 having the dimension C is formed between the adapters 102 and 103. At this point, since the second adapter support member 92 is positioned outside the space 75, the second adapter support member 92 is easily caught on the finger of the operator.

Figure 16C:
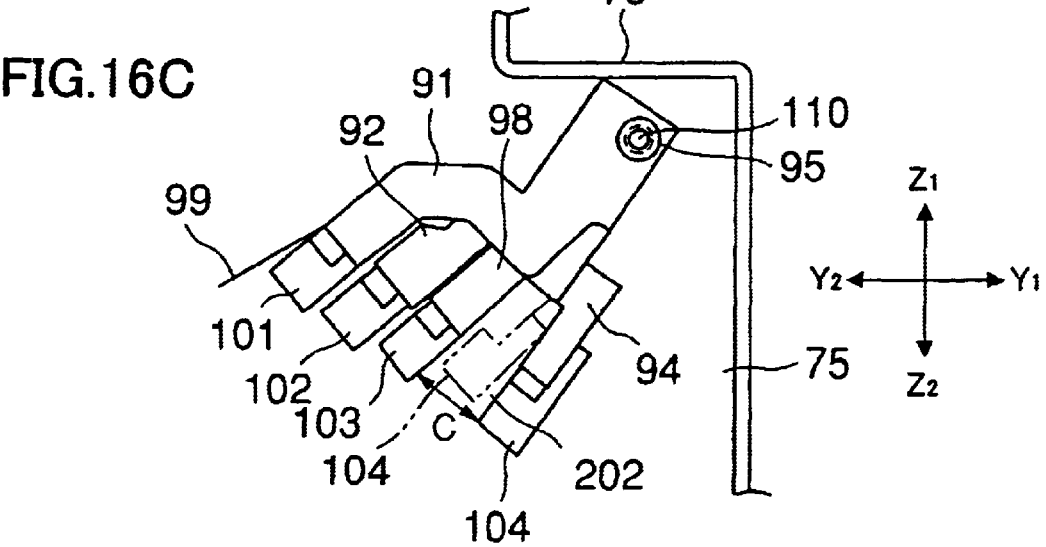

When the operator catches the third adapter support member 93 on her/his finger and pulls the third adapter support member 93 in the $Y_2$ direction in the state shown in FIG. 16B, the third adapter support member 93 is independently rotated in the $Y_2$ direction to enter a state shown in FIG. 16C, where a space 202 having the dimension C is formed between the adapters 103 and 104. At this point, since the lower part of the third adapter support member 93 is positioned outside the space 75, the lower part is easily caught on the finger of the operator.

When the operator catches the fourth adapter support member 94 on her/his finger and pulls the fourth adapter support member 94 in the $Y_2$ direction in the state shown in FIG. 16C, the fourth adapter support member 94 is rotated in the $Y_2$ direction to a position indicated by a double-dot chain line in FIG. 16C. At this time, the fourth adapter support member 94 is rotated together with the bolt members 110 and 111. Here, since the lower end of the fourth adapter support member 94 is positioned at the exit of the space 75, the lower end is easily caught on the finger of the operator.

When the operator takes the finger off the fourth adapter support member 94, the first through fourth adapter support members 91 through 94 are rotated counterclockwise by gravity to return to their original states shown in FIGS. 2, 4A, 4B, and 5.

Here, the second through fourth adapter support members 92 through 94 may be designed so as not to follow the first adapter support member 91. In such a configuration, with the first adapter support member 91 being in the pulled-out state, each of the second through fourth adapter support members 92 through 94 remains in a vertical state shown in FIG. 4B in the space 75. Therefore, it is difficult to catch the second adapter support member 92 on the finger and pulls the second adapter support member 92 out from the space 75. Since the third and fourth adapter support members 93 and 94 are positioned in the bottom, that is, on the $Y_1$ side, of the space 75, the operator has more difficulty in making her/his finger touch the third and fourth adapter support members 93 and 94. Therefore, the configuration of this embodiment provides better operability that the configuration where the second through fourth adapter support members 92 through 94 are prevented from following the first adapter support member 91.

Next, a description will be given of an operation of connecting the optical connectors 140 to the optical connector adapter assembly 76.

Figure 17:
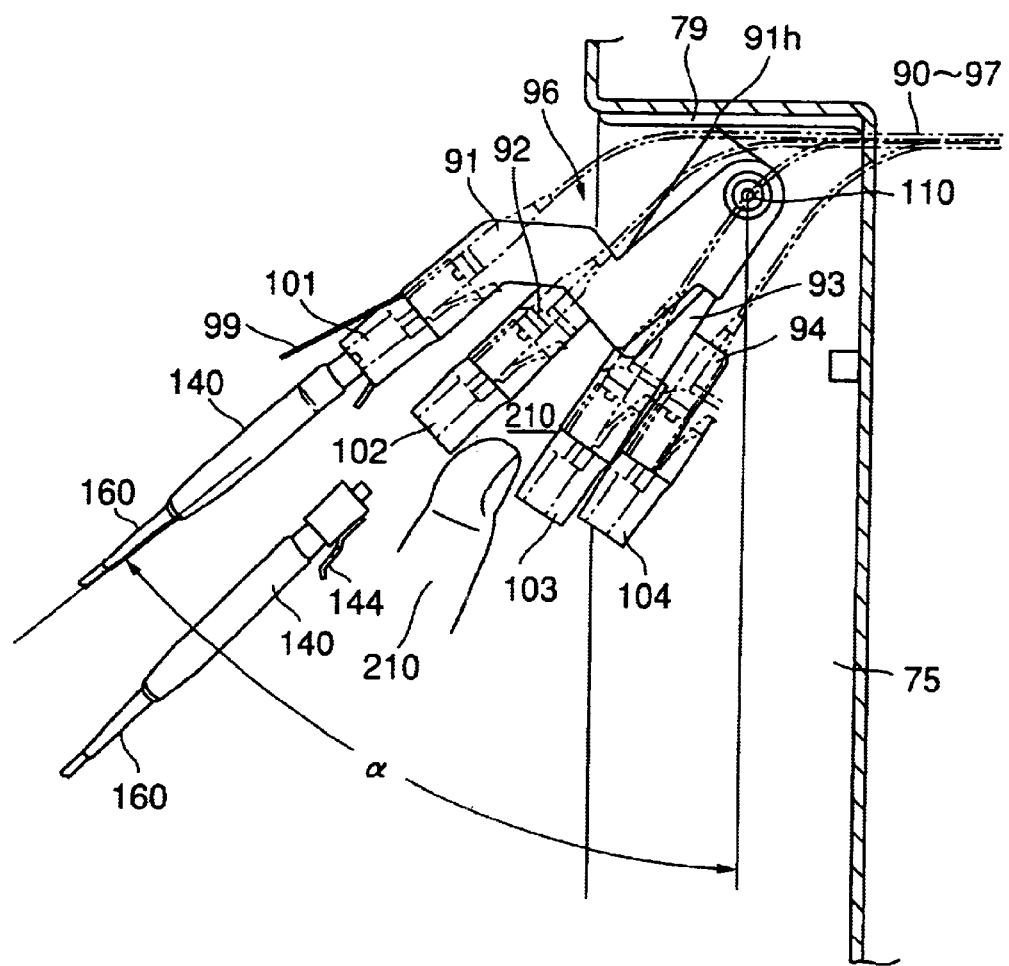
FIG. 17 is a diagram for illustrating optical connector connection and disconnection operations according to the present invention.

The optical connector 140 provided to the tip of the optical fiber cable 150 that is an external line is connected to the adapter 102 in the following manner. First, the adapter assembly 76 is set in the state shown in FIG. 16B. Then, the finger 210 is inserted into the space 201 as shown in FIG. 17 so that the optical connector 140 is inserted into the adapter 102. An operation of releasing a lock by pressing the lock lever 144 at the time of pulling out the optical connector 140 from the adapter 102 is performed in the following manner. First, the adapter assembly 76 is set in the state shown in FIG. 16B. Then, the finger 210 is inserted into the space 201 as shown in FIG. 17 so that the lock lever 144 is pressed in the $Y_2$ direction.

An operation of connecting the optical connector 140 to the adapter 101 and an operation of releasing a lock at the time of pulling out the optical connector 140 from the adapter 101 are performed by setting the adapter assembly 76 in the state shown in FIG. 16A and inserting the finger 210 into the space 200.

An operation of connecting the optical connector 140 to the adapter 103 and an operation of releasing a lock at the time of pulling out the optical connector 140 from the adapter 103 are performed by setting the adapter assembly 76 in the state shown in FIG. 16C and inserting the finger 210 into the space 202.

An operation of connecting the optical connector 140 to the adapter 104 and an operation of releasing a lock at the time of pulling out the optical connector 140 from the adapter 104 are performed by setting the adapter assembly 76 in the state where the fourth adapter support member 94 is in the position indicated by the double-dot chain line in FIG. 16C and inserting the finger 210 into a space formed on the $Y_1$ side of the adapter 104.

An operation of connecting the optical connectors 140 provided to the tips of the optical fibers 90 through 97 extending from the case 72 into the front member 70 with the upper parts of the adapters 101 through 104 and an operation of pulling out the optical connectors 140 from the adapters 101 through 104 by pressing the lock levers 144 are performed by properly setting the optical connector adapter assembly 76 in the states shown in FIGS. 16A through 16C.

With the optical connector adapter assembly 76 being attached to the front member 70 as shown in FIG. 7, a space 220 is formed between the bolt members 110 and 111. Therefore, the optical fibers 90 through 97 are neither hindered by a shaft nor curved unnecessarily inside the front member 70. Further, the existence of the space 220 also facilitates connecting the optical connectors 140 provided to the tips of the optical fibers 90 through 97 with the upper parts of the adapters 101 through 104.

The present invention is not limited to the specifically disclosed embodiment, but variations and modifications may be made without departing from the scope of the present invention.

The present application is based on Japanese priority application No. 2001-272600 filed on Sep. 7, 2001, the entire contents of which are hereby incorporated by reference.

What is claimed is:

1. An optical unit comprising:
   photoelectric conversion modules;
   a plurality of adapter support members whose upper parts are rotatably supported; and
   a plurality of optical connector adapters attached to lower ends of said adapter support members so as to be arranged next to each other, the optical connector adapters being contained in the optical unit,
   wherein said adapter support members are rotated separately so that the optical connector adapters are extracted outside from the optical unit with a space formed between each adjacent two of said optical connector adapters;
   each of said optical connector adapters has insertion holes formed on each of first and second opposing sides thereof;
   optical connectors provided to ends of optical fibers extending from said photoelectric conversion modules are connected to the insertion holes formed on the first sides of said optical connector adapters; and
   optical connectors provided to ends of external optical fibers are connected to the insertion holes formed on the second sides of said optical connector adapters.

2. The optical unit as claimed in claim 1, further comprising an interlock mechanism that rotates one of said adapter support members in a direction to send the optical connector adapter thereof outside the optical unit in conjunction with a rotational movement to send the optical connector adapter of another one of said adapter support members outside the optical unit.

3. The optical unit as claimed in claim 2, wherein said interlock mechanism comprises engaging strips formed on one of said adapter support members which one supports one of the optical connector adapters which one is positioned closest to an outside of the optical unit in a direction in which said optical connector adapters are arranged,
   wherein the engaging strips engage and hold the remaining adapter support members and cause the remaining adapter support members to start rotating when the one of the said adapter support members is rotated by a given angle.

4. The optical unit as claimed in claim 1, wherein one of said adapter support members comprises a stopper that prevents the one of said adapter support members from rotating by more than a given angle, the one of said adapter support members being positioned closest to an outside of the optical unit in a direction in which said adapter support members are arranged.

5. The optical unit as claimed in claim 1, further comprising a shaft member that supports said adapter support members so that said adapter support members are rotatable independently from each other,
   wherein said adapter support members comprise an optical connector adapter assembly so that the optical connector adapter assembly is attached to the optical unit with the shaft member being supported on the optical unit.

6. The optical unit as claimed in claim 1, wherein each of said adapter support members comprises:

an adapter attachment member to which a corresponding one of said optical connector adapters is attached;

first and second arm parts extending upward from opposing sides of the adapter attachment member; and first and second shaft members that support the first and second arm parts so that the first and second arm parts are rotatable independently, wherein the first and second arm parts are supported on the optical unit separately.

7. The optical unit as claimed in claim 6, wherein each of the first and second shaft members has a female screw part in a center thereof.

8. The optical unit as claimed in claim 7, further comprising first and second bolts having cylindrical heads and screwed into the female screw parts of the first and second shaft members, respectively, wherein the heads of said first and second bolts are fitted rotatably in holes formed in the optical unit.

9. The optical unit as claimed in claim 6, wherein said first and second arm parts of each of said adapter support members include step parts of a given step size determined differently for each of said adapter support members;

and said first arm parts of said adapter support members overlap each other and said second arm parts of said adapter support members overlap each other.

10. The optical unit as claimed in claim 6, wherein said adapter support members comprise respective engaging strips that engage said optical connector adapters when said optical connector adapters are connected to said adapter support members.

11. The optical unit as claimed in claim 10, wherein said optical connector adapters comprise respective engaging parts that engage the engaging strips of said adapter support members.

12. The optical unit as claimed in claim 11, wherein each of the engaging parts of said optical connector adapters is formed of a leaf spring.

13. The optical unit as claimed in claim 1, wherein the insertion holes of said optical connector adapters have respective engaging parts that engage the optical connectors when the optical connectors are connected to the insertion holes.

* * * * *